United States Patent
Noveck et al.

(10) Patent No.: US 6,823,363 B1
(45) Date of Patent: Nov. 23, 2004

(54) USER-MODERATED ELECTRONIC CONVERSATION PROCESS

(76) Inventors: Beth S. Noveck, 201 W. 70th St., Apt. 29A, New York, NY (US) 10023; Benjamin R. Barber, 1019 River Rd., Piscataway, NJ (US) 08854

( * ) Notice: Subject to any disclaimer, the term of this patent is extended or adjusted under 35 U.S.C. 154(b) by 0 days.

(21) Appl. No.: 09/427,340

(22) Filed: Oct. 26, 1999

(51) Int. Cl.$^7$ ................................................ G06F 15/16
(52) U.S. Cl. ................... 709/204; 709/204; 709/206; 709/207
(58) Field of Search .................. 709/204, 206, 709/207; 379/202; 704/231; 434/118

(56) References Cited

U.S. PATENT DOCUMENTS

| | | | | |
|---|---|---|---|---|
| 5,440,624 A | * | 8/1995 | Schoof, II | 379/202.01 |
| 5,471,461 A | * | 11/1995 | Engdahl et al. | 370/252 |
| 5,828,839 A | | 10/1998 | Moncreiff | 395/200.34 |
| 5,907,324 A | * | 5/1999 | Larson et al. | 345/751 |
| 5,911,776 A | * | 6/1999 | Guck | 709/217 |
| 5,960,178 A | * | 9/1999 | Cochinwala et al. | 370/412 |
| 6,026,396 A | * | 2/2000 | Hall | 707/104.1 |
| 6,076,100 A | * | 6/2000 | Cottrille et al. | 709/203 |
| 6,256,663 B1 | * | 7/2001 | Davis | 709/204 |
| 6,327,567 B1 | * | 12/2001 | Willehadson et al. | 704/231 |
| 6,401,122 B1 | * | 6/2002 | Matsui et al. | 709/227 |
| 6,411,796 B1 | * | 6/2002 | Remschel | 434/118 |
| 6,438,580 B1 | * | 8/2002 | Mears et al. | 709/204 |

* cited by examiner

Primary Examiner—Ario Etienne
Assistant Examiner—Sahera Halim
(74) Attorney, Agent, or Firm—Peter Canelias (57) ABSTRACT

A method and apparatus for initiating and controlling an electronic conversation comprising the steps of: initiating a electronic conversation between a plurality of users, each user associated with a respective computer, determining whether a number of users engaging in the electronic conversation exceeds a predetermined number of users and, permitting a specific one of the plurality of users to become a moderator of the electronic conversation for a first time period if the number of users engaging in the electronic conversation exceeds the predetermined number of users, and preventing any of the users from becoming the moderator if the number of users engaging in the electronic conversation does not exceed the predetermined number of users. The present invention also allows for a dynamic rotation of the moderator, and allows the plurality of users to change the rules of the electronic conversation.

40 Claims, 12 Drawing Sheets

Name/Handle ______ Urgent ☐ Very-Urgent ☐ Not Urgent ☐

Comment ☐ Respond to ______(Name)______ Post Factoid ☐ On/From ______(Source)______

Subject
(limited
To X
Characters)
[                    ]   Wild Card [      ] — 41

Message
(limited
To X
Characters)
[                                        ]

USER-MODERATED ELECTRONIC CONVERSATION PROCESS

FIELD OF THE INVENTION

The present invention relates to computer programs and processes for carrying out electronic conversations, and in particular, a process for user-moderation of an electronic conversation.

DESCRIPTION OF THE RELATED ART

The use of the Internet as a means of communication has become increasingly popular in recent years. The Internet includes a plurality of means of communication such as: electronic mail (e-mail), bulletin boards and real-time messaging. One of the most popular means of communication on the Internet is on-line "chat". The "chat" feature allows two or more persons located at different computers to converse with one another over the Internet. Messages are sent back and forth in a session known as a "chat room."

Chat rooms are well known. Chat rooms are characterized by interactive discussion windows, wherein a number of users on separate computers can communicate by text entry in a shared text window displayed on each of the users' computers. The information (e.g. text) input from one user of the chat room is relayed to all other users of the chat room. The other users of the chat room can respond by inputting information or text of their own, which is likewise relayed to the other users of the chat room. In this manner, computer users throughout the world can engage in discussions in real time.

Most chat rooms are dedicated to a particular subject (e.g. politics), so that users with similar interests will congregate in certain chat rooms. Additionally, most chat rooms are unmoderated, giving rise to irrelevant comments (e.g. 'flaming'), and conversations that do not stay on point. Some chat rooms provide a set of rules by which the content and form of the discussion is controlled. These rules typically comprise a program (which is part of the chat room operating program) which takes different actions based on the responses of the users of the chat room. Further, some chat rooms are even controlled by external moderators based on a set of rules or by the moderator's own discretion. However, conventional chat rooms do not provide means for moderation of the chat by users of the chat room.

Therefore, it is desirable to provide an electronic environment in which users of the environment can moderate their own discussions.

SUMMARY OF THE INVENTION

The present invention is a method and apparatus for initiating and controlling an electronic conversation comprising the steps of: initiating a electronic conversation between a plurality of users, each user associated with a respective computer, determining whether a number of users engaging in the electronic conversation exceeds a predetermined number of users and, permitting a specific one of the plurality of users to become a moderator of the electronic conversation for a first time period if the number of users engaging in the electronic conversation exceeds the predetermined number of users, and preventing any of the users from becoming the moderator if the number of users engaging in the electronic conversation does not exceed the predetermined number of users.

The above and other advantages and features of the present invention will be better understood from the following detailed description of the preferred embodiments of the invention which is provided in connection with the accompanying drawings.

DETAILED DESCRIPTION

The present invention is a method and apparatus for initiating and controlling an electronic conversation. The present invention comprises a user-moderated electronic conversation process and method which provides an electronic environment in which users of the environment can moderate their own discussions, providing for the deliberative and civil debate essential to any kind of democratic process, without having to rely on undemocratic, external (heteronymous) authority.

Figure 1:
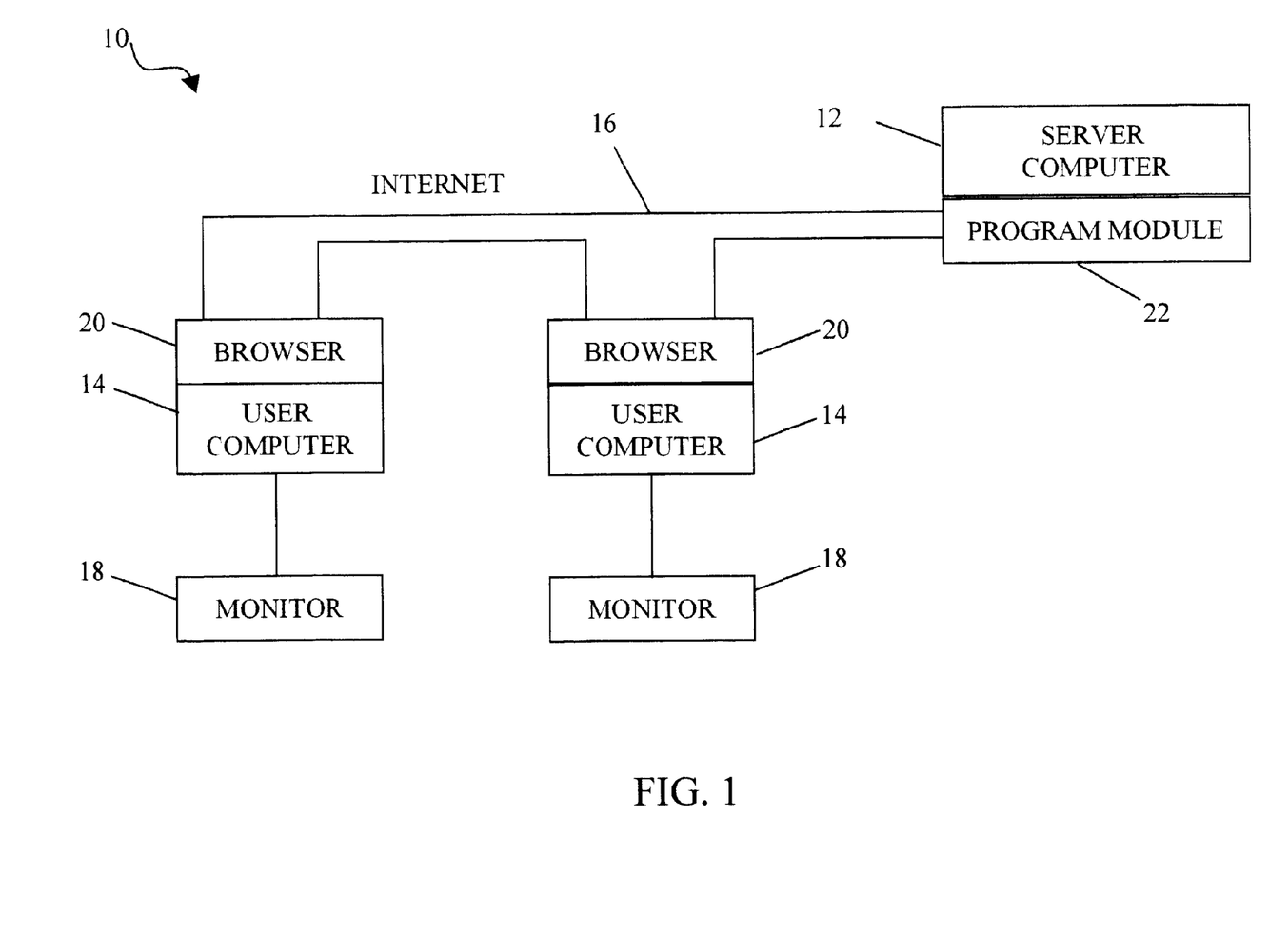
FIG. 1 is a block diagram of a system according to an exemplary embodiment of the present invention.

Referring to FIG. 1, there is shown a system 10 according to an exemplary embodiment of the present invention. The system 10 includes a server computer 12 and a plurality of users' computers 14 (clients). The server computer 12 and the user computers 14 may be connected by a network 16, such as for example, an Intranet or the Internet. The user computers 14 may be connected to the Intranet or Internet by a modem connection, a Local Area Network (LAN), cable modem, digital subscriber line (DSL), or other equivalent connection means. Each user computer 14 includes a video monitor 18 for displaying information and a browser program 20 (e.g. Microsoft Internet Explorer®, Netscape Navigator®, etc.), as is well known in the art. The server computer 12 includes a program module 22 (explained in detail below) which allows the user computers 14 to communicate with one another in real time over the network 16. The program module 22 includes program code, preferably written in PERL, Extensible Markup Language (XML), Java and/or Hypertext Mark-up Language (HTML), which allows the user computers 14 to access the program module through browsers 20, such as, for example, a conversation (e.g. chat) program. The exemplary program module 22 also preferably includes an electronic debate program, explained in detail below, which allows users of the plurality of user computers 14 to interact with one another over the network 16. Although the program is referred to herein as a "debate" program, the program may be used for any type of conversation. The capabilities described below are not limited to debates, and other embodiments of the program that are specifically adapted to other types of conversations are also contemplated as within the scope of the invention.

Figure 2:
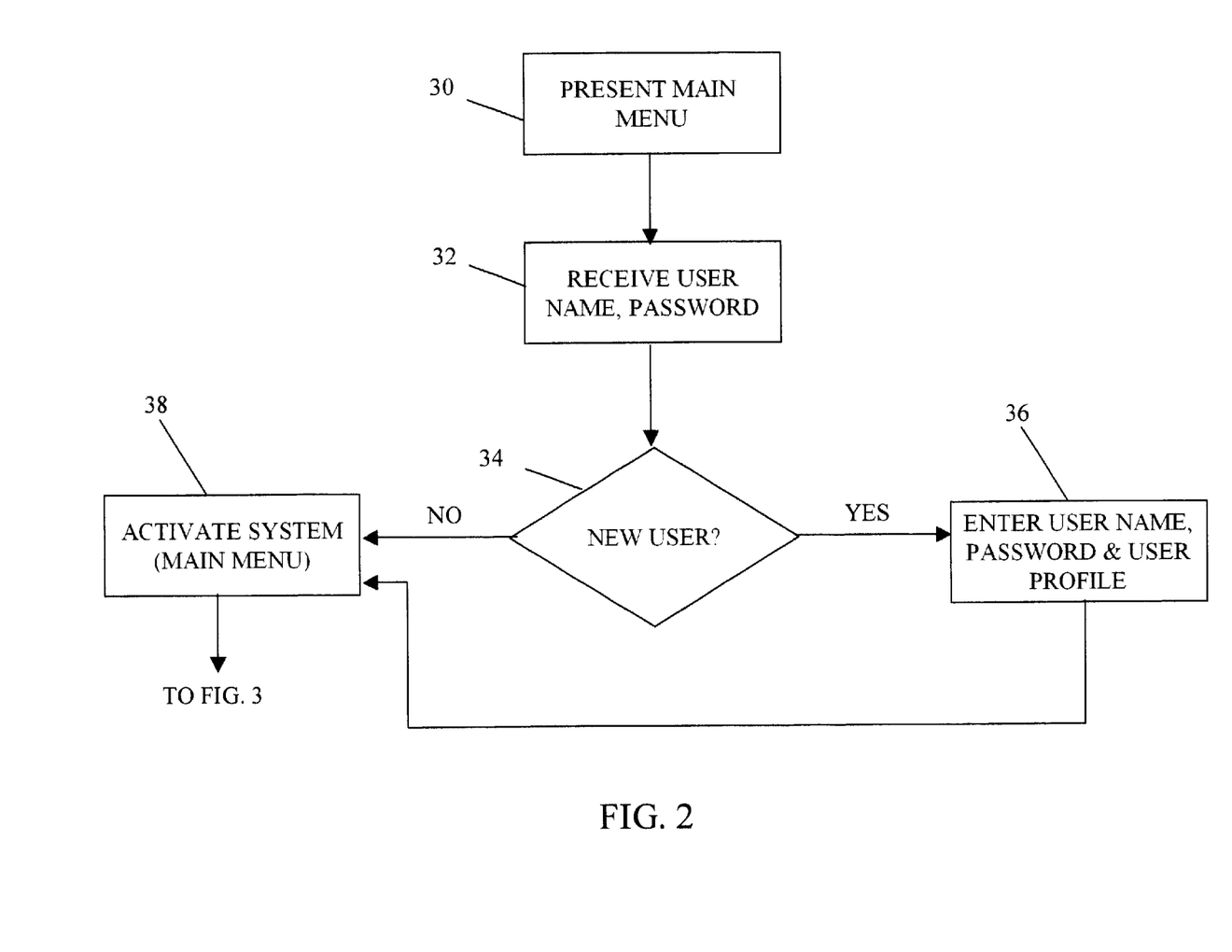
FIG. 2 is a flow chart of the method steps for activating an electronic conversation program according to an exemplary embodiment of the present invention.

FIG. 2 is a flow chart showing method steps for activating an electronic debate program according to an exemplary embodiment of the present invention. The following method steps are executed by the program module 22 in conjunction with the server 12 and the respective user computers 14 and browsers 20. Beginning at step 30, a main menu screen is presented to each user computer 14 on the respective video monitor 18 when the user computer accesses the program module 22 through the network 16. The user computers 14 preferably access the program module 22 by navigating to a website which contains the program module using browser 20. For example, if the network 16 is the Internet, the user computers 14 would access the program module 22 by navigating to a site on the World Wide Web (WWW) (e.g. www.unchat.com) which is stored on the server 12. If the network 16 is an Intranet, the program module 22 would be accessed in much the same way except that the site would be an internal site not accessible through the WWW. When the user computer 14 enters the site (either through the WWW or through an Intranet), a main menu screen 50 (described below) is presented on the video monitor 18 of the user computer.

Figure 10:
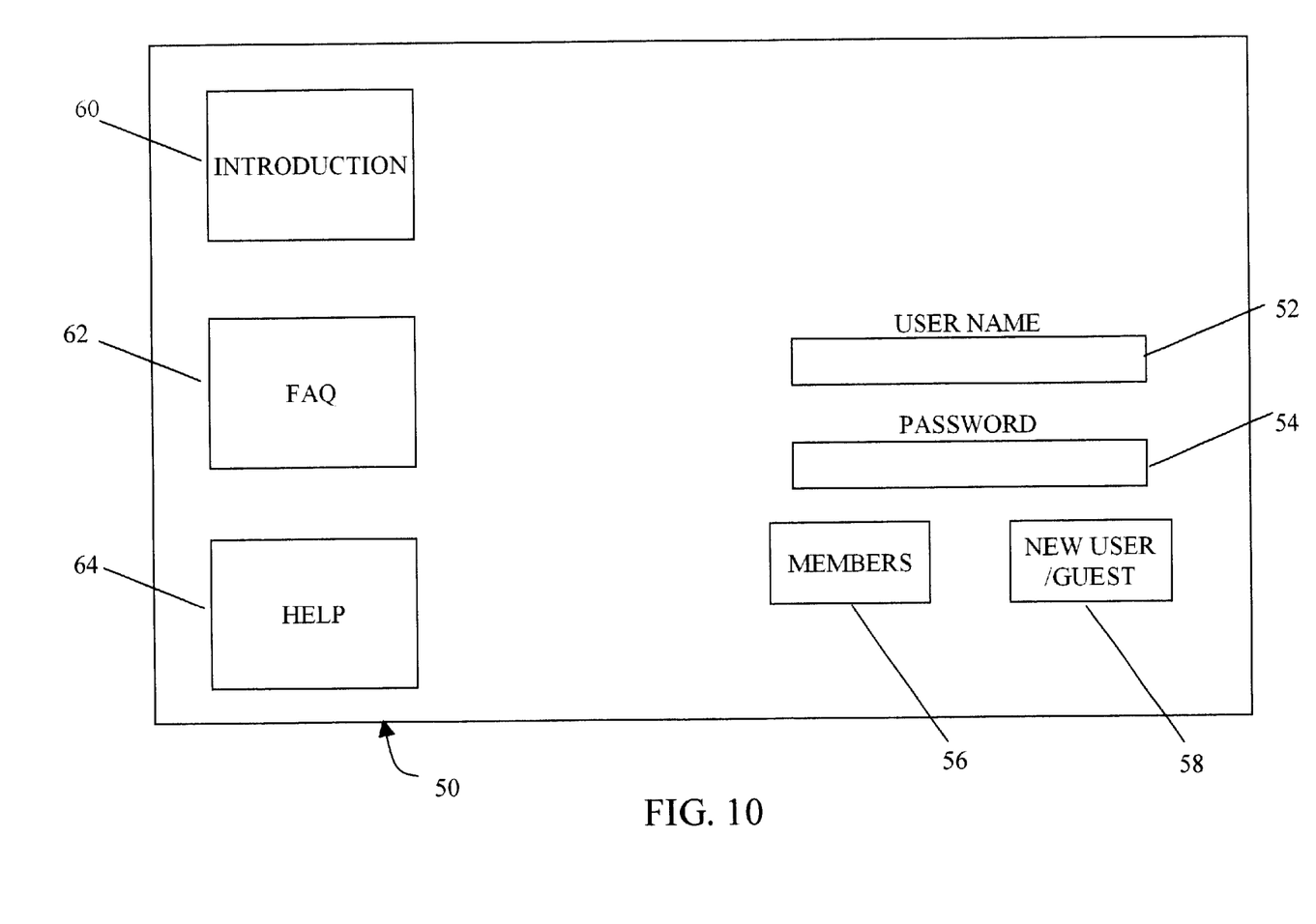
FIG. 10 is a schematic diagram of an exemplary main menu screen.

An exemplary main menu screen 50 is shown in FIG. 10. The main menu screen 50 preferably includes password entry bars 52, 54 for each user to enter a user name and a password. The main menu screen 50 also preferably includes a members' entrance button (icon) 56 and a new user/guest button 58 which may be "clicked" (selected) using a pointing device such as a mouse. The main menu screen 50 also includes an introduction to the electronic debate program which may be accessed by clicking on the introduction button 60. Also included on the main menu screen 50 are a frequently asked questions (FAQ) button 62 and a help button 64, as are well known in the art.

Each user computer 14 enters the electronic debate program stored in program module 22 by entering a predetermined user name and password (or by clicking on the members 56 or new user/guest 58 button) at step 32. At this point, the program module 22 determines whether the user of the user computer 14 is a new user or an established user at step 34. Particularly, when a user name and password is entered, the program module 22 accesses a database within the server computer 12 to determine if the user name and password are entered in the database. If not, the process proceeds to step 36 where the user is prompted to create a user name, password and user profile. The user name and password may comprise any combination of characters (e.g. letters, numbers, etc.), but are both preferably less than 12 characters in length. The user profile preferably contains information about the user (e.g. name, address, e-mail addresses, etc.) and information about the user's particular areas of interest for debate (e.g., abortion issues). This information may be entered through the use of an electronic form which is presented on the monitor 18 of the user's computer 14. During the entry of a user profile, the user can also select whether he or she would like to be emailed (to an email address specified in the user profile) when debates on their particular areas of interest are scheduled. Once a user name and password have been selected, and a user profile have been entered, the process proceeds to step 38 where the members' main menu screen 70 is presented (see FIG. 11). Alternatively, if the user name and password entered are in the database, the process proceeds directly to step 38 where the members' main menu screen 70 appears.

Figure 11:
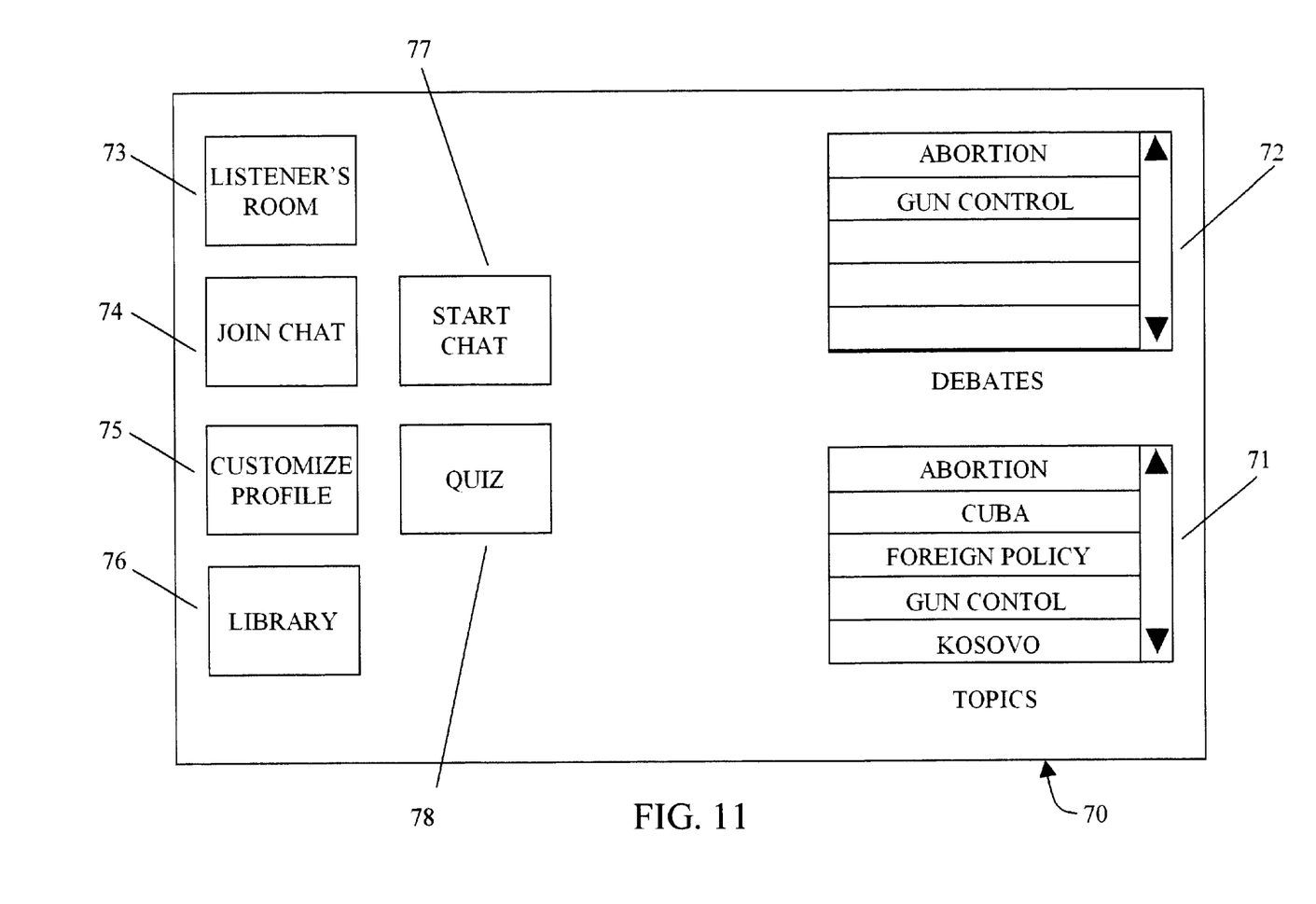
FIG. 11 is a schematic diagram of an exemplary members' main menu screen.

FIG. 11 shows an exemplary members' main menu screen 70. The members' main menu screen 70 preferably includes topic window 71 which lists possible topics for debate. The members' main menu screen 70 also includes a debate window 72 which lists the debates which are presently taking place. The members' main menu 70 also includes several buttons (icons) including: a "listener's room" button 73, a "join chat" button 74, a "customize profile" button 75, a "library" button 76, a "start chat" button 77, and a "quiz" button 78, which provide links to different menus. The "listener's room" button 73 allows the user to enter an area where he or she can 'observe' debates, but not actively participate in them. In other words, the user can see what messages are posted, but can post no messages of her own. A user enters the "listener's room" by clicking (selecting) a debate in the debate window 72, and then clicking the "listener's room" button 73. The "start chat" button 77 allows a user to initiate a chat by selecting at least one topic from the topic window 71 and clicking on the "start chat" button. Then, the new chat session becomes listed on the debate window 72 for selection by other users. The "join chat" button 74 allows the user to join a particular debate, by selecting at least one of the debates listed in the debate sub-screen 72, and clicking on the "join chat" button. The "customize profile" button 75 allows the user to add, delete or modify information in their personal profile. The personal profile is preferably generated when the user initially requests a user name and a password. The "library" button 76 allows the user to enter a database of information which may be used as research material for a debate. Finally, the "quiz" button 78 allows a user to take a quiz on a particular topic. To initiate the quiz, the user selects a topic from the topic window 71, and clicks the "quiz" button 78. This begins a quiz on the particular topic which helps the user become more familiar with the topic before engaging in a debate. By selecting a topic or debate (from windows 71, 72, respectively) and any of the "listener's room" "start chat", or "join chat" buttons 73, 77, 74, a dialog box asking the user if they wish to take a quiz (as described above) on the topic before entering the discussion area is automatically presented. Preferably, this dialog box is only presented the first a user 'listens', 'starts' or 'joins' a chat on a particular subject, so that repeat users are not subjected to the same questions every time.

Figure 3:
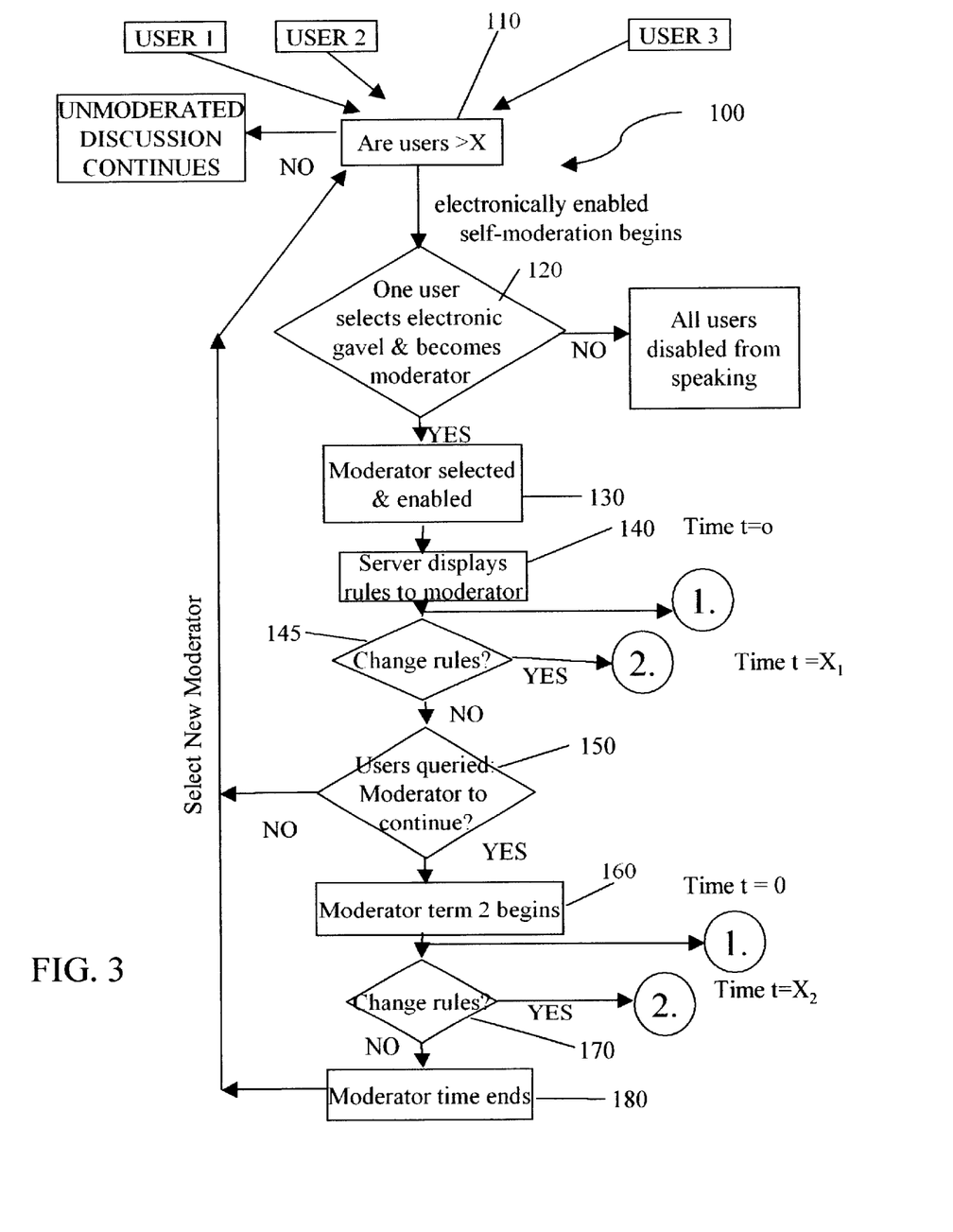
FIG. 3 is a flow chart of the method steps for moderating electronic conversations according to an exemplary embodiment of the present invention.
Figure 4:
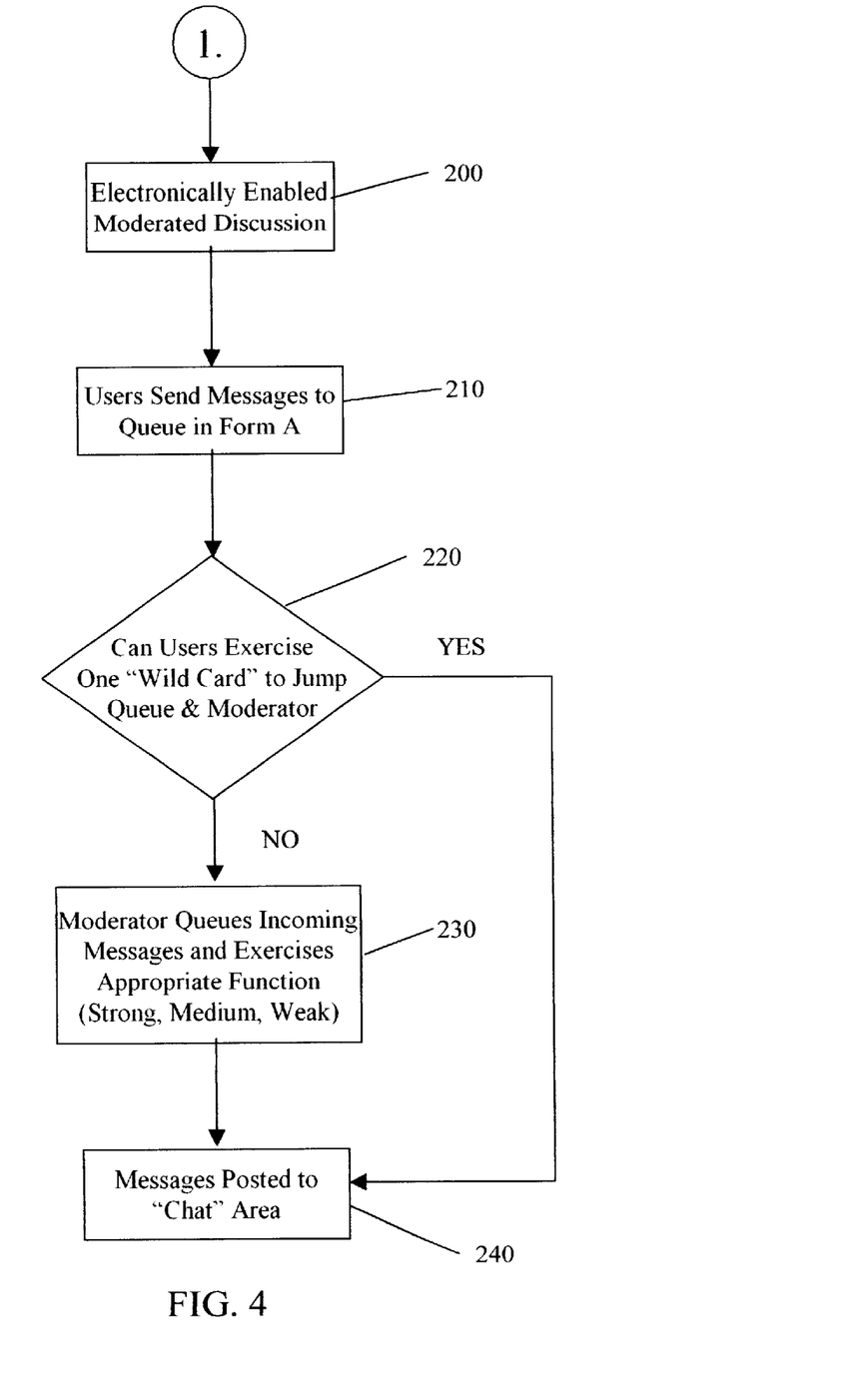
FIG. 4 is a flow chart of the method steps for conducting a moderated electronic conversation according to an exemplary embodiment of the present invention.
Figure 9:
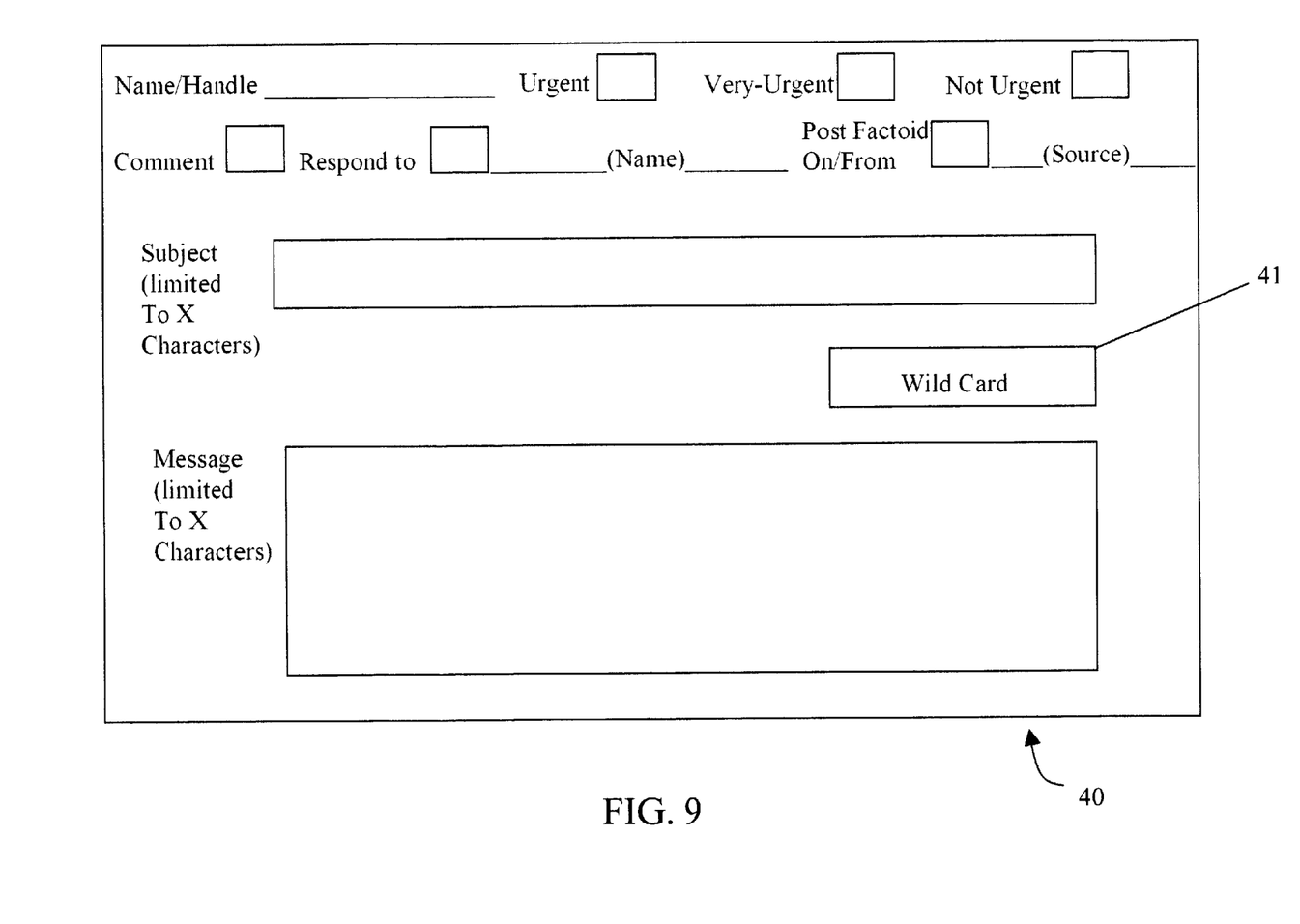
FIG. 9 is a schematic diagram of an exemplary input template screen.

FIG. 3 illustrates a flow chart showing the method steps of a system 100 for moderating electronic debates according to an exemplary embodiment of the present invention. The process begins with at least one user (e.g. User 1) entering a particular discussion area (i.e. chat room) by selecting a topic or debate from sub-menus 71 and 72 and clicking the "start chat" button 77 or "join chat" button 74 from the members' main menu screen 70. This action causes a chat main menu screen 80 (see FIG. 12) to be posted on the video monitor 18 of the user's computer 14. The chat main menu screen 80 includes a scrolling text window 81 which lists all messages posted by users of the chat room as is well known in the art. In particular, users post messages to the chat room using an input template 40 as shown in FIG. 9. Users may enter their messages in the input template 40 by typing them on a keyboard of the computer, or by entering them on any equivalent computer input device (e.g. microphone, etc.). The input template 40 preferably allows users to assign priorities to messages such as "urgent" (designated by the "U" in FIG. 12), "very-urgent" (designated by the "VU" in FIG. 12), or "not-urgent" (designated by the "NU" in FIG. 12) as shown in FIG. 9. The input template 40 also preferably allows users to "attach" files to the message (as is well known in the art). A "post message" button (icon) 82 on the chat main menu screen 70 brings up the input template 40 when clicked on. As the messages of different users are entered into the input templates of each user computer 14, they are posted on the scrolling text window 81 as described below with reference to FIG. 4. The chat main menu 80 also includes a participant window 93 and an observer window 94 which respectively list the participants in the chat and the observers. Participants are those users who have entered the discussion area through the selection of the "start chat" button 77 or "join chat" button 74. Observers are those users who have entered the discussion through the selection of the "listener's room" button 73 on the members' main menu screen 70. The system 100 continuously determines at step 110 the number of users (i.e. participants, not observers) in the discussion area (chat room). When the number of users is greater than a variable X, which may be set to any desirable whole number by the controller (e.g. webmaster) of the discussion area, the discussion becomes moderated. Until the time when the number of users (participants) becomes greater than X, the users may engage in unmoderated discussion (i.e. messages may be posted directly to the scrolling text window 81, as opposed to the queuing procedure described below with reference to FIG. 4). The variable X is preferably at least three (3), but may be any number depending on the dynamics of the discussion. In the embodiment shown in FIG. 1, three users User 1, User 2, and User 3 are logged into the discussion area as participants.

Figure 12:
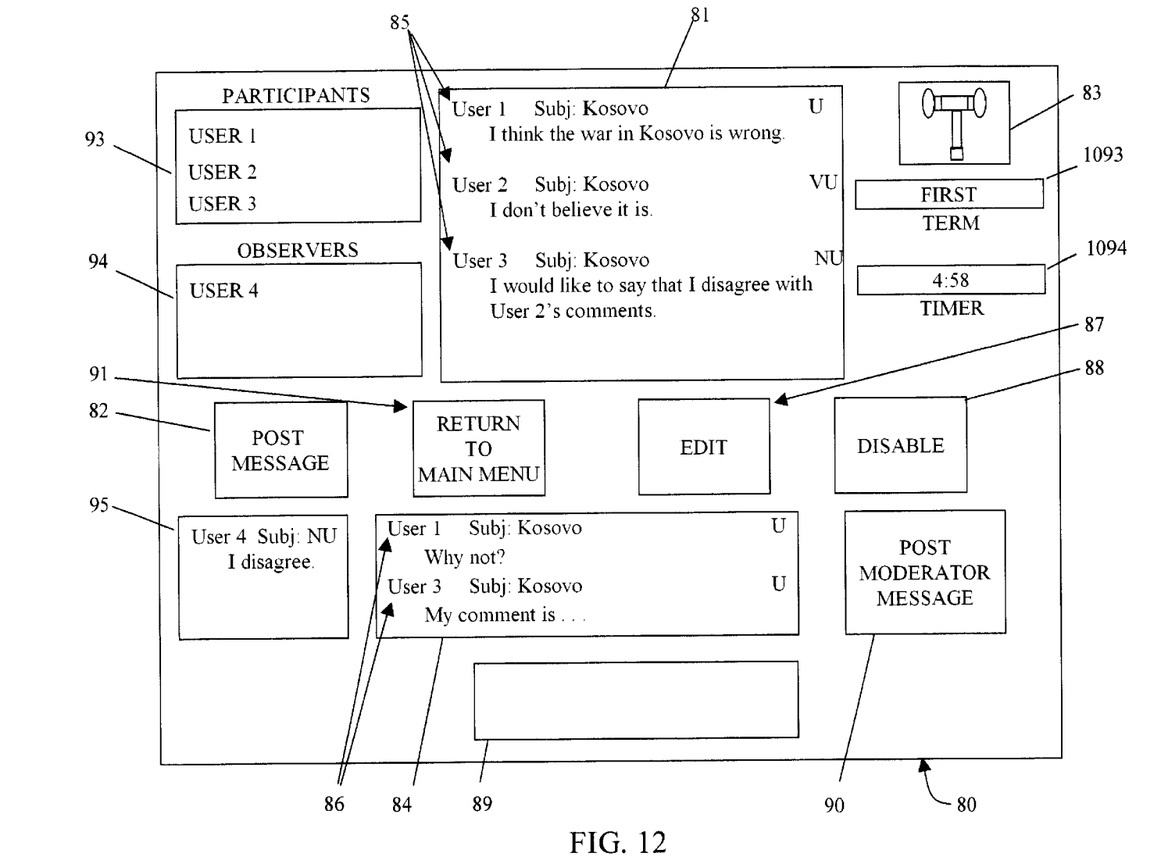
FIG. 12 is a schematic diagram of an exemplary chat main menu screen.

Once the number of users (participants) in the discussion area (chat room) exceeds the variable X, the moderated discussion begins. At this point, one of the users may take control of the discussion by "grabbing" an electronic gavel at step 120. The electronic gavel (or "e-gavel") is presented on the chat main menu 80 of each user as an e-gavel button (icon) 83 which may be clicked (selected) using the pointing device or the keyboard of the respective user's computer (see FIG. 13). Until the number of users in the discussion area reaches the variable X, the e-gavel button 83 is 'grayed-out' as is well known in the art. After the number of users in the discussion area exceeds the variable X, and until the point when one of the users selects the electronic gavel, all users are prevented from contacting one another through the discussion area (e.g. the "post message" button 82 is 'grayed-out').

Preferably, the first user to select or click on the electronic gavel button becomes the moderator at step 130, however, there may be a also be a random selection process if more than one user clicks the electronic gavel at approximately the same time (e.g. within 1–2 seconds of one another). Once one of the users is given the electronic gavel, the chosen user becomes the moderator of the discussion at step 130 and is shown the moderation rules at step 140. The moderation rules are standard rules which may be altered by the users at step 145 of the process (explained below). In the exemplary embodiment of the present invention there are three basic moderation rules: moderation type (strong or weak), voting type (unanimous, super-majority, majority), and editing type (full edit, partial edit). The initial settings for the rules are default settings where the moderation type is weak, the voting type is majority and the editing type is partial. Once the rules have been displayed to the moderator at step 140, a timer begins which times the duration of the moderator's first term. A first time interval ($t=0$ to $t=X_1$) for the moderator can be set to any suitable length, but preferably, the duration of the time interval is 15 minutes (e.g. $X_1=15$ minutes). The users are then queried at step 145 whether they want to change the moderation rules. If a majority (i.e. assuming majority is the voting rule) of the users decide to change the rules, the process proceeds to step 300 described below. If a majority of users decide to not change the moderation rules, the moderated discussion then proceeds as shown at steps 200–240 in FIG. 2 and explained in detail below.

Step 200 begins the time interval and the moderated electronic debate between users. At step 210, users send messages to the discussion area (chat room) through an input template 40 shown in FIG. 9. As stated above, in order to bring the input template 40 onto the screen, the user clicks (selects) the "post message" button 82 on the chat main menu screen 80. Then, the user fills in the different areas of the input template 40 (e.g. subject, message, etc.) and preferably hits the "RETURN" key on the keyboard of the computer 14 to post the message to the discussion area. Although the keyboard is the preferred means for entering messages, other equivalents means (e.g. microphone with 'speak' software) may be used. Before the message is posted in the discussion area, however, it is placed in a queue. The queue is controlled at step 230 by the moderator through a queue window 84 which appears on the chat main menu screen 80. Although the queue window 84 appears on video monitors 18 of all the user computers 14, only the current moderator may see the messages present in the queue window and manipulate the information in the queue window. The other users see only the user name ("user name" in FIG. 12), subject heading ("Subj." in FIG. 12) and urgency level ("U", "VU" or "NU" in FIG. 12) of the message on their respective queue windows 84. The individual non-moderator users may select to close the queue window 84 so that it does not distract from their enjoyment of the main discussion taking place in scrolling text window 81. The type of moderation (i.e. strong or weak) and the type of editing (i.e. full or partial) directly affect how much control the moderator has with respect to messages in the queue. If the moderation type is strong, all messages must be approved by the moderator before they are posted to the discussion area, the moderator can intervene in the discussion, and the moderator can disable users from speaking (posting messages). If the moderation type is weak, the moderator may only intervene in the discussion and remove remarks from the discussion area where necessary (i.e. if a user has posted a message that the moderator feels is inflammatory or unrelated to the discussion), or disable a user's ability to post messages to the discussion area for a time. If the editing type is full, the moderator has the ability to completely edit any messages in the queue. If the editing type is partial, the moderator cannot edit messages in the queue. After messages have been approved by the moderator (for strong moderation) and edited (for full editing), or after they have been placed in the queue (for weak moderation and partial editing), the messages are posted in the discussion area through scrolling text window 81 of the chat main menu screen 80 at step 240. FIG. 13 shows several messages 85 which have been posted to the scrolling text window 81, and several messages 86 which remain in the queue window 84.

Each user may be given at least one electronic "wild card" which allows the user to skip over the queue, and consequently the moderator's control. Step 220 shows the process for playing a "wild card." Each "wild card" allows a single message of the user to skip over the queue. The user exercises the "wild card" by selecting the "wild card" box 41 on the input template 40 (see FIG. 9). If the user has a "wild card" to play, the message will skip the queue and be posted directly to the scrolling text window 81 at step 240. If the user does not have a "wild card" to play, they will receive a message in the form of a dialog box asking if they still wish to post the message. If the user selects 'yes', the message is posted to the queue like any other message, if the user selects 'no', the input template is removed from the screen along with the message.

Figure 5:
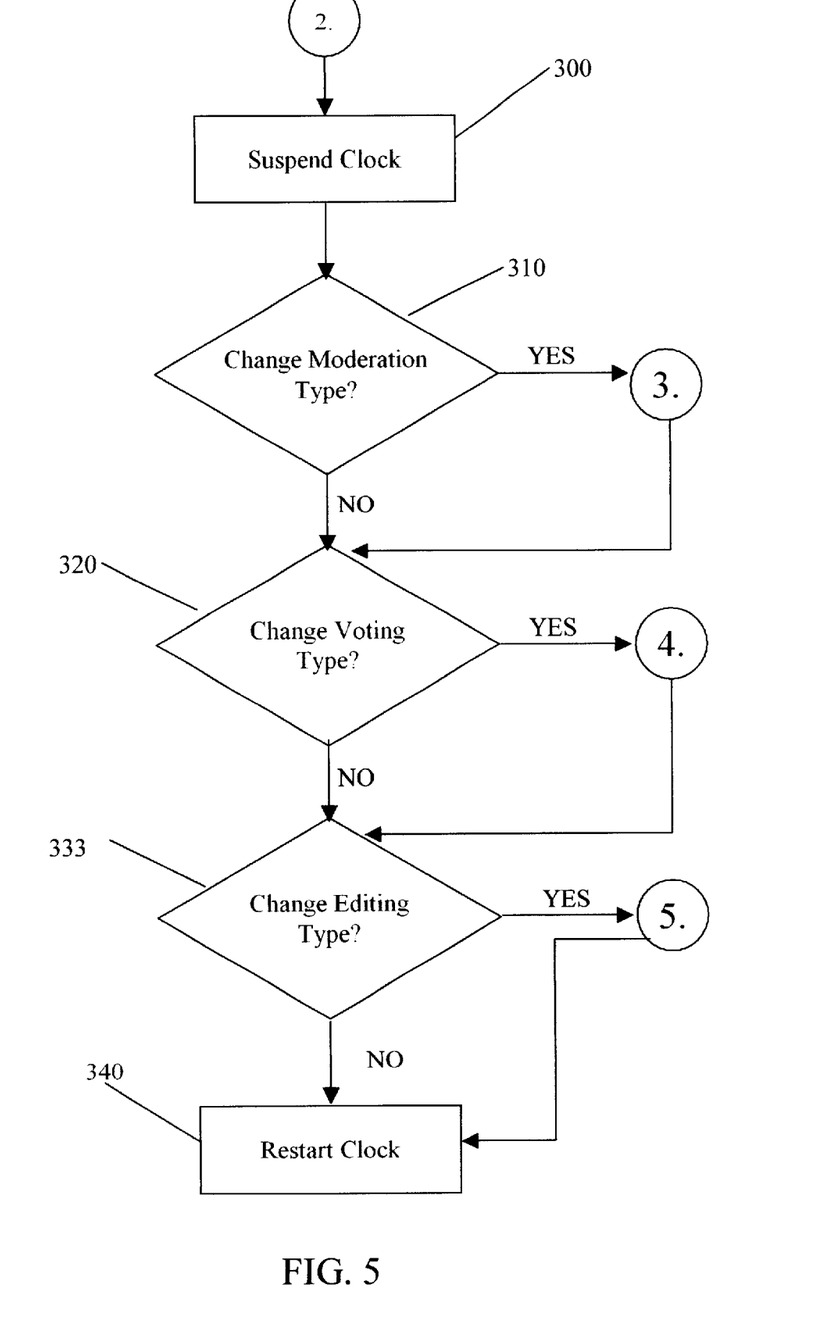
FIG. 5 is a flow chart of the method steps for changing the moderation rules of the electronic conversation of the present invention.

The moderator controls the queue through the queue window 84 and buttons located on the chat main menu screen 80. The "edit" button 87 allows the moderator to edit messages in the queue when strong editing is the editing rule. When weak editing is the editing rule, the "edit" button 87 is not selectable by the moderator (e.g. it is 'grayed out'). The "disable" button 88 allows the moderator to disable one or more of the users from posting messages to the discussion area. By selecting one of the messages of the user in the chat window 85 and then clicking the "disable" button, the moderator effectively removes the particular user from the discussion. The user or user's user name(s) then appears in a "disabled" window 89. The moderator may remove the user or users from the "disabled" window, and thus re-enable their chat functions by clicking on the user name in the "disabled" window and then again clicking the "disable" button 88. It should be noted that the "disable" function is available during both strong and weak moderation. The moderator may disable a user for speaking for any specified period of time. However, if the moderator disables a user from speaking (posting messages), that user may be disabled only until the end of the moderator's term, once the moderator's term ends, the user is again enabled to speak (post messages). The "post moderator message" button 90 allows the moderator to post messages to the discussion area for the purpose of moderating the discussion. When the moderator clicks the "post moderator message" button 90, the input template 40 (see FIG. 9) appears on the moderator's screen, and the moderator enters a message just as another user would. The difference is that the moderator's messages are not sent to the queue, but are rather sent directly to the discussion are and are immediately posted in the scrolling text window 81. The "return to main menu" button 91, like the "post message" button 82, are selectable by all users, and not just the moderator. The chat main menu screen 80 also includes a term bar 93 and a timer bar 94 which indicate the term of the moderator (e.g. first or second) and the time left in the moderator's term, respectively. The moderator continues moderating the discussion until the time interval of the moderator's first term expires. At the beginning of the moderated discussion (i.e. when a user first becomes the moderator), the users may decide to change the moderation rules. The users are preferably presented with a dialog box which asks them whether they want to change the moderation rules (see step 145; FIG. 3). Since the default voting rule is 'majority', a majority of users must agree to change the moderation rules. If a majority of users decide to change the moderation rules, the process proceeds to step 300 (FIG. 5).

At step 300, the clock is suspended so that the time spent changing the moderation rules does not count against the moderator's first term. First, the users are queried if they wish to change the "moderation type" at step 310. There are two types of moderation (i.e. strong and weak) in the exemplary embodiment of the present invention, however, it should be noted that any number of different types of moderation may be utilized without departing from the scope of the invention. If a majority of the users decide to change the moderation type, the process proceeds to step 400. If the majority of users decide not to change the moderation type, the process proceeds to step 320 where the users are queried about changing the "voting type." Again, in the exemplary embodiment of the present invention there are three types of voting (i.e. unanimous, supermajority, and majority), however, it should be noted that any number of different types of voting may be utilized without departing from the scope of the invention. If a majority of the users decide to change the voting type, the process proceeds to step 500. If the majority of users decide not to change the voting type, the process proceeds to step 330 where the users are queried about changing the "editing type." Again, in the exemplary embodiment of the present invention there are two types of editing (i.e. full and partial), however, it should be noted that any number of different types of editing may be utilized without departing from the scope of the invention. If a majority of the users decide to change the editing type, the process proceeds to step 600. If the majority of users decide not to change the editing type, the process proceeds to step 340 where the clock is restarted and the moderated discussion resumes.

Figure 6:
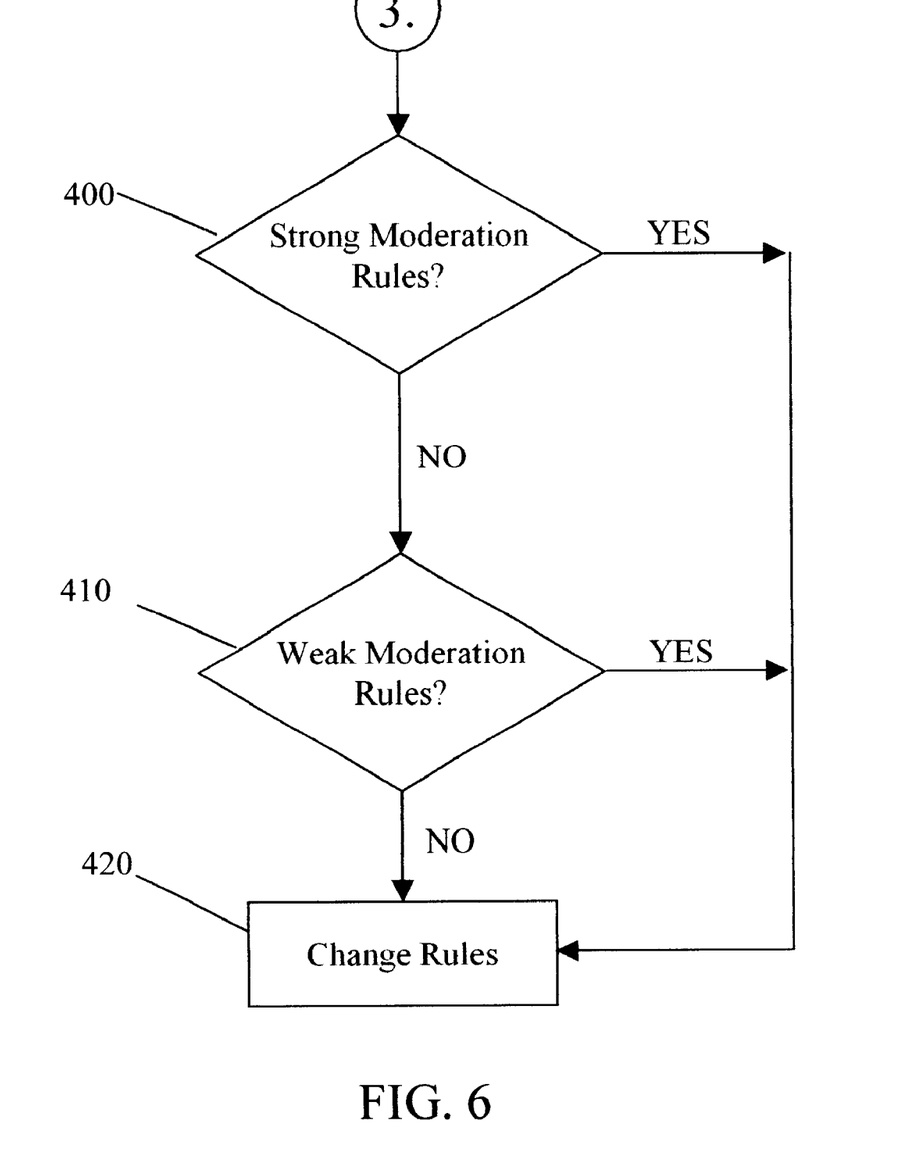
FIG. 6 is a flow chart of the method steps for changing the type of moderation of the electronic conversation of the present invention.

FIG. 6 shows the process for changing the moderation type. As explained above, in the exemplary embodiment of the present invention there are two types of moderation: strong and weak. Strong moderation allows the moderator to control all messages posted to the discussion area (i.e. choose which messages are posted from the queue window 84 to the scrolling text window 81, and in what order), intervene in the discussion, and disable users from speaking. Weak moderation only allows the moderator to intervene in the discussion and to disable users from speaking. The default setting for moderation type is preferably weak moderation. At step 400, users are queried as to whether they want strong moderation. If a majority of the users choose strong moderation, the rules are changed at step 420. If the majority of users do not choose strong moderation, the process proceeds to step 410 where the users are queried as to whether they want weak moderation. If a majority of the users choose weak moderation, the rules are changed at step 420. If the majority of the users select neither strong or weak moderation, the moderation rule remains unchanged.

Figure 7:
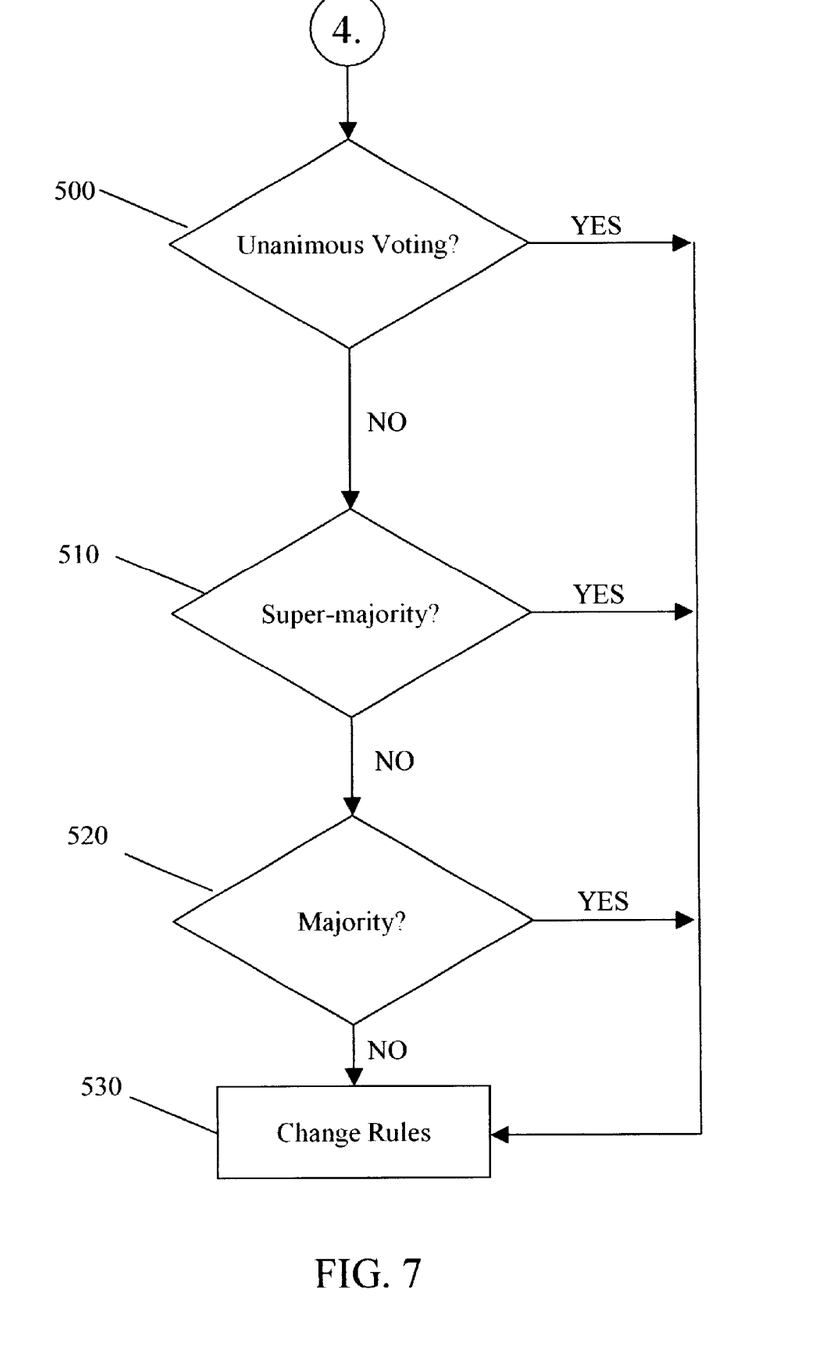
FIG. 7 is a flow chart of the method steps for changing the type of voting of the electronic conversation of the present invention.

FIG. 7 shows the process for changing the voting type. As explained above, in the exemplary embodiment of the present invention there are three types of voting: unanimous, supermajority, and majority. Unanimous voting requires all users in the discussion area to concur in any decision made (e.g. a decision to change the moderation rules), supermajority requires two-thirds ($\frac{2}{3}$) of the users to concur in any decision, and majority voting requires more than one half ($\frac{1}{2}$) of the users to concur in any decision. The default setting for voting type is preferably majority voting. At step 500, users are queried as to whether they want unanimous voting. If a majority of the users choose unanimous voting, the rules are changed at step 530. If the majority of users do not choose unanimous voting, the process proceeds to step 510 where the users are queried as to whether they want supermajority voting. If a majority of the users choose supermajority voting, the rules are changed at step 530. If the majority of users do not choose supermajority voting, the process proceeds to step 520 where the users are queried as to whether they want majority voting. If a majority of the users choose majority voting, the rules are changed at step 530. If the majority of the users select neither of unanimous, supermajority or majority voting, the voting rule remains unchanged.

Figure 8:
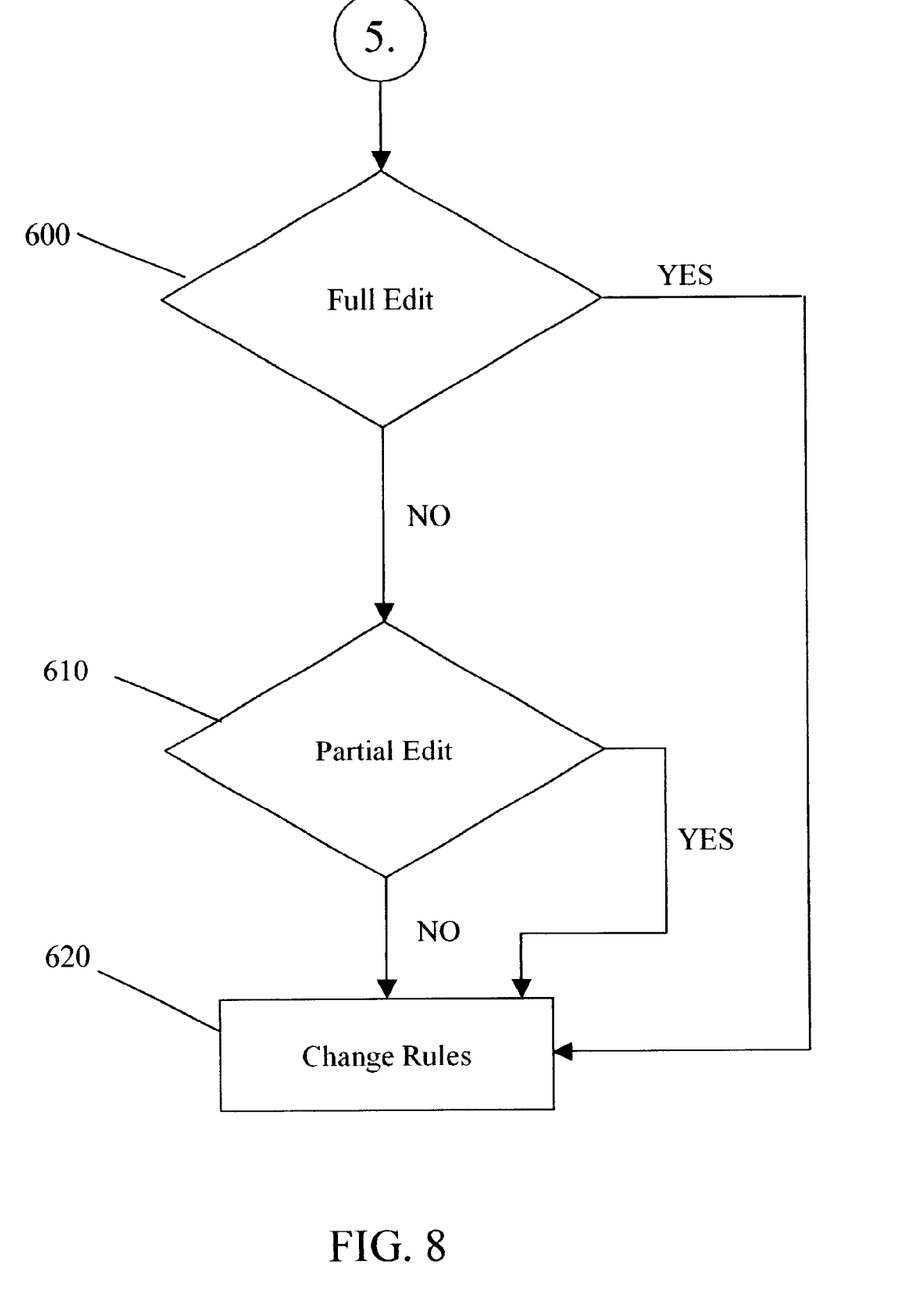
FIG. 8 is a flow chart of the method steps for changing the type of editing of the electronic conversation of the present invention.

FIG. 8 shows the process for changing the editing type. As explained above, in the exemplary embodiment of the present invention there are two types of editing: full and partial. Full editing allows the moderator to completely edit all messages posted to the queue by users. Partial editing does not allow the moderator to edit messages. The default setting for editing type is preferably partial editing. At step 600, users are queried as to whether they want full editing. If a majority of the users choose full editing, the rules are changed at step 620. If the majority of users do not choose full editing, the process proceeds to step 610 where the users are queried as to whether they want partial editing. If a majority of the users choose partial editing, the rules are changed at step 620. If the majority of the users select neither full not partial editing, the editing rule remains unchanged.

When the moderator's first term expires, the other users (i.e. those who are not the moderator) of the system are queried if they wish the current moderator to continue at step 150. This query may be in the form of a dialog box which appears on the screens of the users. The answers of the users are polled and are used to determine if the moderator continues. Since majority voting is the default rule, unless the users have changed the rules, the majority of the users will determine the outcome of the query. In other words, if there are three users and a moderator, the majority (i.e. 2) of the three users will determine if the moderator is changed or not. If there are an even number of users (e.g. 2), and the decision is split, the system 100 will randomly decide whether or not the moderator remains. If the majority (or random) decision is to change moderators, the process proceeds back to step 110 where a new moderator is selected. If the majority (or random) decision is to keep the moderator, the moderator begins a second term at step 160. Again, a timer begins at this point to control the time interval of the moderator's second term. Preferably, the second term is of the same time interval as the first term (e.g. $X_2=15$ minutes), however, the second term may be of any interval. The second term is substantially similar to the first term, and the users again engage in a moderated discussion at steps 200–240. Once the second term has begun, the users are queried again as to whether they would like to change the rules of moderation at step 170. The process for changing the rules is explained above with reference to FIG. 5, and therefore will not be repeated here. The moderator continues moderating the discussion until the time interval of the second term expires at step 180. Once the moderator's second term expires, the process returns to step 110 where a new moderator is selected and the process begins anew.

During the above process 100, users who do not wish to participate in the debate may watch the debate as observers. As described above with reference to FIG. 11, a user may select a debate and click on the "listener's room" button 73 (from members' main menu screen 70) to observe a debate. This brings up the chat main menu screen 80 to the observer user (see FIG. 12). From the chat main menu screen 80, the observer user can watch as comments are posted to the scrolling text window 81. If the observer user has a comment to add, they may post the comment to a "baton queue" by clicking on the "post message" button 82 on the chat main menu screen 80. Messages posted to the "baton queue" are preferably only seen by the moderator, and are listed in the baton queue window 95 of the chat main menu 80. As with the queue window 84, the non-moderator users may see the user name ("user name" in FIG. 12), subject heading ("Subj." in FIG. 12) and urgency level ("U", "VU" or "NU" in FIG. 12) of messages posted to the baton queue in the baton queue window 95, but may not see the messages themselves. Also, as with the queue window 84, the individual users may select to close the baton queue window 95 so that it does not distract from their enjoyment of the main discussion. The moderator may, but need not, take comments from the "baton queue" and add them to the discussion by clicking (selecting) on the comment in the baton queue window 95 and 'dragging' it (as is well known in the art) to the scrolling text window 81. Alternatively to posting comments to the "baton queue", the observer user may click on the "return to main menu" button 91 which brings the user back to the members' main menu screen 70 (see FIG. 11), where the user can join the debate as a participant. However, if the number of users in the chat room has been restricted for some reason (e.g. size, etc.), a user's only choice may be to post messages to the "baton queue." If space becomes available in the chat room (e.g. a user or users leave), the moderator may select users from the observers' window 94 to join the chat room by clicking (selecting) on the user(s) in the observers' window and dragging the user(s) to the participants' window 93.

Although not specifically discussed above, a limit may be placed on the number of participant users and observer users in a debate to facilitate smoother discussions. Limiting the number of participants also replicates the real-life limit on the number of people that can effectively participate in any on-point, useful conversation. Additionally, a limit may also be placed on the number of characters in each message posted. Further, a time limit may be placed on each participant user, such that of if the user does not post a message for a set period of time (e.g. 20 minutes), the user is removed from the participant list (and participant window 93) and placed into the observer list (and observer window 94).

In an alternative embodiment, the moderator may have the capability to choose, a priori, the order in which users' messages can be displayed, if multiple messages are placed in the queue.

Thus, the process of the present invention provides a user-moderated electronic debate/conversation. The benefits of democratic user moderation include: the ability for participants to run their own conversation and thereby take a greater interest in it, imparting responsibility for the quality of the conversation to those participating in it, the opportunity for users of different language groups to find each other and engage in moderated conversation regardless of the language of the host site, the opportunity for users to engage in democratically-run electronic conversation that allows everyone to be heard, the chance to build rules of parliamentary procedure into the architecture of the program, the replication of the "New England" town meeting on-line, and the replication of qualities of real-life conversation on a computer network, the electronic replication of gestures, such as hand-raising and waving, and other body language in an electronic form, through appropriate and novel program architecture (e.g. "baton queue", "e-gavel").

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A computer-implemented method for initiating and controlling an electronic conversation comprising the steps of:
   initiating a electronic conversation between a plurality of users, each user associated with a respective computer;
   determining whether a number of users engaging in said electronic conversation exceeds a predetermined number of users; and,
   permitting a specific one of the plurality of users to become a moderator of the electronic conversation for a first time period if the number of users engaging in said electronic conversation exceeds said predetermined number of users, and preventing any of the users from becoming the moderator if the number of users engaging in said electronic conversation does not exceed said predetermined number of users.

2. The method of claim 1, wherein the steps of permitting a specific one of the users to become the moderator and preventing any of the users from becoming the moderator respectively comprise electronically permitting one of the users to become the moderator and electronically preventing any of the users from becoming the moderator.

3. The method of claim 1, comprising the further step of:
   permitting the plurality of users to change at least one conversation rule once a specific one of the users has become the moderator of the electronic conversation.

4. The method of claim 3, wherein the at least one conversation rule is one selected from the group consisting of: a moderation rule, a voting rule, and an editing rule.

5. The method of claim 4, wherein the moderation rule is one selected from the group consisting of: strong moderation and weak moderation.

6. The method of claim 4, wherein the voting rule is one selected from the group consisting of: unanimous voting, supermajority voting, and majority voting.

7. The method of claim 4, wherein the editing rule is one selected from the group consisting of: partial editing and full editing.

8. The method of claim 1, comprising the further step of:
   querying the plurality of users after an expiration of said first time period as to whether they wish the moderator to continue; and,
   permitting the moderator to continue for a second time period if a predetermined number of the users agree to let the moderator continue; and,
   preventing the moderator from continuing if a predetermined number of users agree to not let the moderator continue.

9. The method of claim 8, wherein said predetermined number of users is one selected from the group consisting of: a majority of users, a supermajority of users, and all users.

10. The method of claim 1, wherein the step of permitting one of the plurality of users to become the moderator comprises:
    determining which user of the plurality of users has activated an icon disposed on respective computer screens of the plurality of users and permitting that user to become the moderator.

11. The method of claim 1, wherein said predetermined number of users is at least three.

12. The method of claim 1, wherein the first time interval is at least fifteen minutes.

13. The method of claim 1, comprising the further steps of:
    receiving messages from the plurality of users; and,
    posting at least one of the messages to a video screen of each of the plurality of users.

14. The method of claim 10, comprising the further step of:
    sending the messages to an electronic queue before posting the at least one message to the video screen of each of the plurality of users.

15. The method of claim 14, comprising the further step of:
    allowing the moderator to selectively post messages from the electronic queue to the video screens of each of the users.

16. The method of claim 1, wherein the step of initiating a electronic conversation between a plurality of users comprises:
    assigning a user name and a password to each of the plurality of users for entry on each user's respective computer;
    referencing the user name and password entered by each user of the plurality of users with a database of user names and passwords; and,
    permitting users to engage in electronic conversation with one another if the user name and password entered by each of the plurality of users are entered in the database.

17. The method of claim 1, comprising the further steps of:
    permitting each of the plurality of users to select to receive at least one electronic message regarding specified electronic conversations; and,
    transmitting an electronic message to users who select to receive said at least one electronic message.

18. The method of claim 1, comprising the further step of:
    administering a quiz to at least one of the plurality of users before allowing the at least one user to engage in the electronic conversation.

19. A computer readable medium having embodied thereon a computer program for processing by a machine, the computer program comprising:
    a first code segment for initiating an electronic conversation between a plurality of users, each user associated with a respective computer;
    a second code segment determining if a number of users engaging in said electronic conversation exceeds a predetermined number of users; and,
    a third code segment for permitting a specific one of the plurality of users to become a moderator of the electronic conversation for a first time period if the number of users engaging in said electronic conversation exceeds said predetermined number of users, and preventing any of the users from becoming the moderator if the number of users engaging in said electronic conversation does not exceed said predetermined number of users.

20. The computer readable medium of claim 19, wherein the steps of permitting a specific one of the users to become the moderator and preventing any of the users from becoming the moderator respectively comprise electronically permitting one of the users to become the moderator and electronically preventing any of the users from becoming the moderator.

21. A computer data signal encoded in a carrier wave comprising:
    a first code segment for initiating an electronic conversation between a plurality of users, each user associated with a respective computer;

a second code segment determining if a number of users engaging in said electronic conversation exceeds a predetermined number of users; and, a third code segment for permitting a specific one of the plurality of users to become a moderator of the electronic conversation for a first time period if the number of users engaging in said electronic conversation exceeds said predetermined number of users, and preventing any of the users from becoming the moderator if the number of users engaging in said electronic conversation does not exceed said predetermined number of users.

22. The computer data signal of claim 21, wherein the steps of permitting a specific one of the users to become the moderator and preventing any of the users from becoming the moderator respectively comprise electronically permitting one of the users to become the moderator and electronically preventing any of the users from becoming the moderator.

23. A computer system comprising:

at least one server computer; and, a plurality of computer terminals coupled to said server through a network, each terminal associated with a particular user, said at least one server computer having a program stored thereon for facilitating communications between the plurality of computer terminals, said program executing the method steps of:

initiating an electronic conversation between the plurality of users;

determining if a number of users engaging in an electronic conversation over the network exceeds a predetermined number of users; and, permitting a specific one of the plurality of users to become a moderator of the electronic conversation for a first time period if the number of users engaging in said electronic conversation exceeds said predetermined number of users, and preventing any of the users from becoming the moderator if the number of users engaging in said electronic conversation does not exceed said predetermined number of users.

24. The computer system of claim 23, wherein the steps of permitting a specific one of the users to become the moderator and preventing any of the users from becoming the moderator respectively comprise electronically permitting one of the users to become the moderator and electronically preventing any of the users from becoming the moderator.

25. The computer system of claim 23, comprising the further step of:

permitting the plurality of users to change at least one conversation rule once a specific one of the users has become the moderator of the electronic conversation.

26. The computer system of claim 25, wherein the at least one conversation rule is one selected from the group consisting of: a moderation rule, a voting rule, and an editing rule.

27. The computer system of claim 26, wherein the moderation rule is one selected from the group consisting of: strong moderation and weak moderation.

28. The computer system of claim 26, wherein the voting rule is one selected from the group consisting of: unanimous voting, supermajority voting, and majority voting.

29. The computer system of claim 26, wherein the editing rule is one selected from the group consisting of: partial editing and full editing.

30. The computer system of claim 23, comprising the further step of:

querying the plurality of users after an expiration of said first time period as to whether they wish the moderator to continue; and, permitting the moderator to continue for a second time period if a predetermined number of the users agree to let the moderator continue; and, preventing the moderator from continuing if a predetermined number of users agree to not let the moderator continue.

31. The computer system of claim 30, wherein said predetermined number of users is one selected from the group consisting of: a majority of users, a supermajority of users, and all users.

32. The computer system of claim 23, wherein the step of permitting one of the plurality of users to become the moderator comprises:

determining which user of the plurality of users has activated an icon disposed on respective computer screens of the plurality of users and permitting that user to become the moderator.

33. The computer system of claim 23, wherein said predetermined number of users is at least three.

34. The computer system of claim 23, wherein the first time interval is at least fifteen minutes.

35. The computer system of claim 23, comprising the further steps of:

receiving messages from the plurality of users; and, posting at least one of the messages to a video screen of each of the plurality of users.

36. The computer system of claim 32, comprising the further step of:

sending the messages to an electronic queue before posting the at least one message to the video screen of each of the plurality of users.

37. The computer system of claim 36, comprising the further step of:

allowing the moderator to selectively post messages from the electronic queue to the video screens of each of the users.

38. The computer system of claim 23, wherein the step of initiating a electronic conversation between a plurality of users comprises:

assigning a user name and a password to each of the plurality of users for entry on each user's respective computer;

referencing the user name and password entered by each user of the plurality of users with a database of user names and passwords; and, permitting users to engage in electronic conversation with one another if the user name and password entered by each of the plurality of users are entered in the database.

39. The computer system of claim 23, comprising the further steps of:

permitting each of the plurality of users to select to receive at least one electronic message regarding specified electronic conversations; and, transmitting an electronic message to users who select to receive said at least one electronic message.

40. The computer system of claim 23, comprising the further step of:

administering a quiz to at least one of the plurality of users before allowing the at least one user to engage in the electronic conversation.

* * * * *